Patented Aug. 30, 1938

2,128,616

UNITED STATES PATENT OFFICE 2,128,616

PROCESS FOR PREPARING TRITURATIONS OF FRESH PLANTS

Alfred Kuhn, Radebeul-Dresden, Germany, assignor to Dr. Madaus & Co., Radebeul-Dresden, Germany, a trading partnership of Germany No Drawing. Application January 8, 1937, Serial No. 119,711. In Germany January 9, 1936

7 Claims. (Cl. 167—82)

This invention relates to a process for preparing triturations of fresh plants.

When medicinal plants are worked up into medicaments they generally suffer injury, in other words, all the substances contained in the fresh plants are no longer present in the final medicament. It is immaterial whether the medicinal plant be dried, or whether tea decoctions or tinctures be prepared. The losses that occur vary and are dependent on the method of preparation, but they always occur. These losses attain a minimum when fresh plants or parts of plants are comminuted into triturations with certain kinds of sugar, for example grape sugar, and more particularly with honey.

It has now been found in accordance with the present invention, that better effects, that is to say, smaller losses, can be obtained if fresh plants or parts of plants be converted into solid products with the aid of amorphous and preferably water-soluble polysaccharides, starch in particular and also amylose, products of degradation of starch, such as dextrin and the like, having given good results.

The reactions that take place in these processes, i. e. in the comminution of fresh plants or parts of plants, in the presence of sugar, are probably as follows:—

The natural structure of the fresh plant parts, which is favourable to the conservation, of the substances, is of course destroyed, but the constituents of the plant, torn from their natural arrangement, are immediately offered another stable, preservative arrangement on the large surfaces of the particles of sugar simultaneously forming during the trituration or coming into contact with the plant part, the volatile components being immediately adsorbed and retained on large surfaces.

Owing to the presence of sugar or the like, the access of oxygen to the plant substance is on the one hand rendered considerably more difficult during the comminution and thus the chemical action thereof is from the outset considerably lessened, while on the other hand the adsorption of the substances on large surfaces of sugar affords protection from oxidation in much the same way as, for instance, a readily oxidizable metal in a colloidal solution is protected from oxidation by its protective colloid. Fatty oils, for example, are thus protected from becoming rancid.

The agglomeration (coagulation) of the substances cannot occur, since the substances, as they are liberated during the comminution, are immediately bound securely to large surfaces of sugar.

The comminution of parts of plants in the presence of sugar and the like can naturally be carried much further than when the comminution is carried out without sugar. The comminution of the plant substance in the sugar can therefore readily be continued up to colloidal dimensions.

From the foregoing it will at once be apparent that the substance added in the comminution of the plant will be the more effective, the more rapidly it presents large surfaces to the plant parts during the comminution, or the larger the surfaces it contains in itself from the outset. Based on this consideration a scale of effectiveness is immediately obtained:

(a) Milk sugar is a good crystallizing sugar, large surfaces being provided in proportion to the fineness used; they increase with progressive comminution of the mixture of plant parts and sugar.

(b) Non-crystallizing or poor crystallizing sugars are characterized by a high speed of formation of nucleus and low speed of growth of the crystals, and they therefore represent in the solid state an extremely fine crystalline aggregate, the size of the crystallites extending down to submicroscopic dimensions. Even without comminution they therefore possess very large internal surfaces, into which the substances of the plants immediately diffuse during the comminution, being held firm there. Honey belongs to this group of sugars. Their more favourable action in comparison with milk sugar is thus understandable.

(c) Amorphous polysaccharides, such as starch, amylose, tragacanth, pectin and the like and their degradation products must, as the very term "amorphous" indicates, have a composition of crystallites of colloidal dimensions, the size of which is even inferior to that of the substances mentioned under heading (b), so that thanks to a still further enlarged surface the action of the latter is also surpassed.

The products obtained in accordance with the foregoing methods, are preferably dried by subjecting the pulp obtained by the trituration to the action of warm air, the moisture content of which is continually decreasing, until a moisture content of less than 2% of water is reached, since the method of drying is also of decisive importance if the important plant substances are to be retained in the resulting permanent preparation. If the moisture content of the dry air during the drying process be not adjusted to the moisture content of the mixture at every moment, the upper layers will dry up too much and also lose important volatile constituents besides the water. The mass will also become non-uniform.

One method of procedure in accordance with the present invention is, for example, to comminute in the edge mill 5 kgs. of menth. pip. rec. with 5 kgs. of a mixture consisting of 10% dextrose (grape sugar), 30% maltose and 50% amyloses, and to dry the resulting mixture in a current of air at a temperature of about 17° C. in such a way that the moisture content of the material to be dried is slowly reduced.

In accordance with the new method it is possible to obtain solid products from fresh plants, which not only still contain to a large extent the volatile constituents of the fresh plants, but also contain all of their other constituents, such as alkaloids, unstable glucosides, ferments, and the like.

If, for example, 300 grams of milk sugar be worked up in the edge mill with 300 grams of menth. pip. and 15 peppermint oil, and the resulting mixture be then dried in a slow current of air at temperatures between 25° C. and 30° C., a product is finally obtained which although only containing 7% of water, also has an oil content of only 0.49%. If the experiment be carried out in the same way, but using 250 grams of grape sugar in mixtures with 50 grams of honey in place of the milk sugar, a product is obtained which has an oil content of 4.85% with, however, a water content of 29.3%.

It is thus possible, by using grape sugar mixed with honey in place of the milk sugar, to raise the oil content of the preparations to a tenfold value. If finally the experiment be carried out in the same manner as described above, but utilizing grape sugar alone, a preparation containing 5% of oil is also obtained, but again containing 25.3% of water.

If the experiment be now carried out of partially replacing the sugars by starch or products of the degradation of starch, for example by a mixture of dextrose, maltose and amylose, the procedure being otherwise the same as described above, a preparation is finally obtained which, while having an oil content of 3.85% has a water content of only 11%.

These experiments, in which the peppermint oil was added for the reason that the oil content of the peppermint itself would be too low in this mixture to carry out a reliable quantitative measurement of the oil, show that with the same drying time and under otherwise comparable conditions a preparation of the fresh plants with starch or products of degradation of starch gives off very much more water, i. e. becomes drier, than a preparation which is made without the presence of starch, while nevertheless the proportion of valuable oil is maintained.

A further increase in the effectiveness of these triturations can be attained if the trituration be carried out from the outset with alkaline media. Use can be made in this case of alkali carbonates, alkali bicarbonates, alkali and alkaline earth hydroxides, alkaline earth carbonates and the like. It is fundamentally immaterial what alkali is added to the plant pulp before the drying, or preferably even during the trituration. It is of course possible to use any substance that does not counteract the purposes of the trituration and that is adapted to exhibit a certain alkalinity. Buffer salts can naturally also be employed in order to ensure a complete neutralization both during the trituration and during the drying process, without fear of disturbance through an excess of alkali.

It is naturally also fundamentally immaterial what cation is employed, although for preference the alkali, alkaline earth and ammonium compounds are used. The same applies in relation to the anion. It is merely necessary to ensure that the substance used possesses the desired alkalinity. It is thus naturally possible and in certain circumstances appropriate to use as acids those which are already contained for example, in the plant to be triturated.

With the aid of this method of working it is also, for example, possible to obtain readily disintegrated carbohydrates. In the case of inula helenium, for example, it was found that when in accordance with the hitherto known method the inula root was comminuted with grape sugar and dried in a current of cold air, only 82.8% of the original inulin content was present on the first day, 64.5% on the second day, 63.0% on the third day, 62.2% on the fourth day and 61.4% on the fifth day. When, on the other hand, the trituration and drying were carried out in the presence of an addition of 3% of calcium carbonate, the inulin content amounted to 94.6% on the first day, 90.8% after two days and then fell to 87%, whereupon no further loss of inulin occurred.

*Example I*

5 kgs. of milk sugar are intensively triturated with 150 grams of sodium carbonate and with this mixture 5 kgs. of thuja are then comminuted in a roller mill. If this trituration be then rapidly dried at room temperature with decreasing moisture of the drying air, a green trituration is obtained, while that produced without the addition of bicarbonate is brown in colour, i. e. the chlorophyll is spoilt.

*Example II*

5 kgs. of grape sugar are intensively triturated with 150 grams of calcium carbonate and with this mixture 5 kgs. of fresh, whole juniper berries are comminuted with the aid of a meat mincing machine and then subjected to the drying in cold air with decreasing moisture of the drying air. A product is then obtained which possesses 54% of the original oil content, whereas the normal trituration with grape sugar without an added substance contains only 21% of the original oil.

*Example III*

5 kgs. of pinus silvestris are intensively comminuted in a mixture consisting of 4.35 kgs. of grape sugar, 500 grams of pectin and 150 grams of sodium bicarbonate and dried in a current of cold air, as described in the preceding example.

The comminution of the fresh plants is, for example, carried out by mixing the fresh plants or parts thereof with the sugars and subjecting them, for example in a roller mill, to a repeated crushing and tearing process. Depending on the hardness and structure of the plant, repeated tearing is necessary until there is obtained a homogeneous dispersion which no longer enables the original structure of the plant to be recognized.

The resulting trituration must then be dried with appropriate speed without the use of high temperatures, it being necessary, however, to take care that no crusts are formed. In order to accelerate the drying process the product while still damp is conveniently divided into "noodle" or strip form produced, for example, by meat mincers or multiple extrusion presses. The subsequent drying process is carried out, in order to avoid the formation of crusts, in such a way that the products are either dried in accordance with the per se known countercurrent principle, or by continually reducing the moisture content of the drying air by appropriate measures with decreasing water content of the material to be dried.

In order to increase the homogeneity, it is of course possible to subject the product thus obtained to a final trituration, either for example as previously indicated in roller mills, or in the mechanically driven mortars hitherto customary in homeopathy.

The products obtained in accordance with this method are intended for preference to be used in homeopathical pharmacy, without however an absolute limit being thereby imposed on their use.

The process of the present invention can, for example, also be used for the production of preparations of fresh folia digitalis tit., and is therefore able to replace the use of the simple drug hitherto alone available.

The products obtained in accordance with the present process are not homeopathic triturations in the old sense of the term, such as are obtained from the dry drug, minerals or chemicals and the like by trituration with milk sugar. In contradistinction thereto the fresh plants or parts of plants, quite independently of their physical nature, their structure, size, toughness and the like, are made available in accordance with the present invention for a trituration process, which nevertheless in the end enables homogeneous triturations as understood in homeopathy to be obtained.

With the manually operated or machine driven mortar triturating machines hitherto known in homeopathy such a process has been technically impossible, unless quite soft plant components, for example non-lignefied plant parts such as fresh green mint leaves, were used.

The present process however, enables parts of plants which per se are difficult to triturate, such as tough, fibrous and woody plant parts after the nature of nettle stalks or roots and rhizomes, to be rapidly and easily triturated.

It should also be mentioned that in accordance with the present invention the use of metals, which has always given rise to discolorations with the tannic substances of the plants, is unnecessary, since the trituration can be carried out in apparatus consisting of materials which do not enter into any reaction with the fresh plant, for example hard porcelain, porphyry, granite and the like.

I claim:—

1. The process of producing preparations containing the volatile constituents of fresh plants, comprising mixing fresh plants with grape sugar and a salt having an alkaline reaction, and triturating the mixture, and then drying the resultant mass.

2. The process of producing preparations containing the volatile constituents of fresh plants, comprising mixing fresh plants with a mixture of grape sugar and honey and a salt having an alkaline reaction, and triturating the mixture, and then drying the resultant mass.

3. The process of producing preparations containing the volatile constituents of fresh plants comprising triturating fresh plants with a mixture of sugar, and an amorphous water-soluble polysaccharide of the group consisting of starch, amylose and their products of degradation, tragacanth, and pectin, and then drying the resultant mass.

4. The process of producing preparations containing the volatile constituents of fresh plants comprising triturating fresh plants with a mixture of sugar and an amorphous water-soluble polysaccharide of the group consisting of starch, amylose, and their products of degradation, tragacanth, and pectin, and in the presence of a salt having an alkaline reaction, and then drying the resultant mass.

5. The process of producing preparations containing the volatile constituents of fresh plants, comprising mixing fresh plants with a sugar and a salt having an alkaline reaction and triturating the mixture to obtain a homogeneous dispersion, next forming the mixture into strips, and then drying the strips by a current of air not exceeding room temperature while continually reducing the moisture content of the air current.

6. The process of producing preparations containing the volatile constituents of fresh plants, comprising mixing fresh plants with sugar and a salt having an alkaline reaction and triturating the mixture, and then drying the resultant mass.

7. The process of producing preparations containing the volatile constituents of fresh plants, comprising mixing fresh plants with sugar and an amorphous water-soluble polysaccharide of the group consisting of starch, amylose and their products of degradation, tragacanth, and pectin, and triturating the mixture to obtain a homogeneous dispersion, next forming the mixture into strips, and then drying the strips by a current of air not exceeding room temperature while continuously reducing the moisture content of the air current.

ALFRED KUHN.